G. H. SARGENT.
GREASE CUP.
APPLICATION FILED JUNE 14, 1917.

1,332,920.

Patented Mar. 9, 1920.

Inventor
George H. Sargent.
By Wilkinson Huxley
Attys.

Witnesses:

UNITED STATES PATENT OFFICE.

GEORGE H. SARGENT, OF CHICAGO, ILLINOIS, ASSIGNOR TO SARGENT COMPANY, OF CHICAGO, ILLINOIS, A CORPORATION OF ILLINOIS.

GREASE-CUP.

1,332,920.  Specification of Letters Patent.  Patented Mar. 9, 1920.

Application filed June 14, 1917. Serial No. 174,685.

*To all whom it may concern:*

Be it known that I, GEORGE H. SARGENT, a citizen of the United States, residing at Chicago, in the county of Cook and State of Illinois, have invented certain new and useful Improvements in Grease-Cups, of which the following is a specification.

My invention relates to lubrication and to a novel means for lubricating bearings of large size and particularly means for feeding the lubricant and also for protecting it from dirt and other foreign matter.

My invention covers a grease cup for use principally on moving parts where it is desirable that the several parts of the cup be self contained to prevent damage to the grease cup as well as to prevent damage of the several parts when the grease cup is filled. The grease cup which I employ comprises a body casing having a closed top and an opening in the side for the introduction of the lubricant the lower end of the cup being open through which the lubricant is fed to the part to be lubricated. As a means for feeding the lubricant I provide a plunger preferably with a spring to force it downwardly. I also employ a cover for the filling aperture.

One of the objects of my invention is to provide a grease cup having a side opening and a novel means for closing said opening.

Another object is to provide a grease cup having a plunger feed with means for maintaining the plunger in inoperative position when it is desirable to use the grease cup as an inert grease reservoir.

These and other objects will be apparent from the drawings, wherein:—

Figure 1:
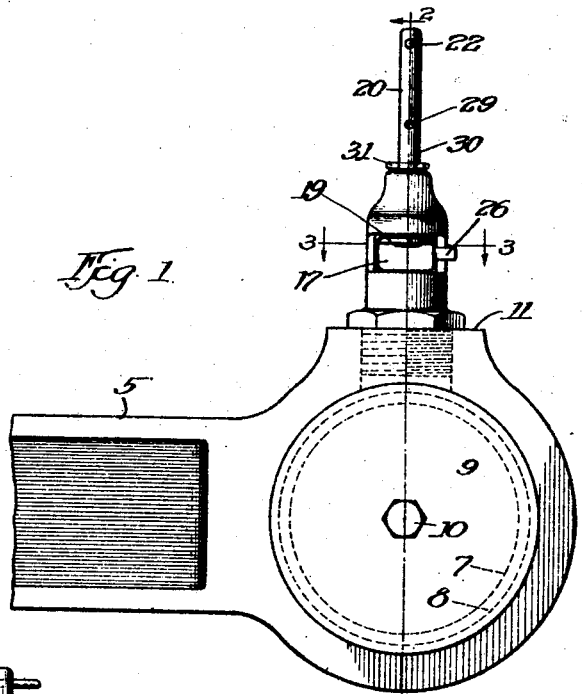
Figure 1 is a side elevation of a portion of the crank having mounted thereon the preferred form of my invention.

5 is the end of a crank connected with shaft 6 which has a reduced end portion 7 for the bushing 8 and a cover plate member 9 held onto the end of the shaft 6 by means of the screw 10. The crank is provided with a shoulder 11 having therein an oil feeding aperture 12 preferably with screw threads on its interior portion. The bushing 8 is also provided with an aperture 13 registering with the aperture 12 in the crank. The grease cup of my invention comprises a body casing 14 having a lower end opening of substantially the same size as the inner diameter of the body of the casing and an enlarged boss or shoulder 15 at the lower portion of the casing adapted to be engaged by a wrench or other tool so as to move the grease cup firmly into position in the aperture 12. The casing is provided with a closed end portion 16 as shown, which is reduced in diameter. Positioned in the side of the casing is an aperture 17 which I prefer to make so as to extend over less than 180° surface of the casing. Within the casing there is a vertical aperture 18 and a plunger 19 mounted therein for reciprocation. The plunger has a stem 20 extending through an aperture 21 in the closed top 16 and having a pin 22 positioned in its upper end for the purpose of raising it past the filling aperture 17. The interior of the casing portion adjacent the opening 17 is formed with a recess or counterbored portion 23 extending around the interior of the casing. Within this recess 23 I mount a circular band of sheet spring metal to form a cover member 24, the band having an aperture 25 adapted when in opened position to register with the aperture 17 in the casing 14. For serving as a handle to move the circular band 24 I provide an out-turned portion 26 with which the band may be moved. The recess 23 is made so that when the circular cover member 24 is inserted therein the interior surface of the cover member 24 will be flush with the inner walls of the casing 14, namely the surface of the aperture 18 so that when the piston or plunger 19 is reciprocated, it may be reciprocated within the cover member 24 so as to be positioned above the upper portion of the opening 17 in the casing, thus permitting lubricant to be put into the grease cup. The reduced upper end portion 16 of the casing is provided with an aperture 27 smaller in diameter than the aperture 18 in the casing proper. Positioned around the stem 20 is a coil spring 28 acting against the upper side of the plunger 19 and the under side of the end member 16. The length of the aperture 27 is sufficient to permit the spring 28 to be compressed without being distorted or harmed in any manner.

To secure a uniform feed of grease or lubricant to the end 7 of the shaft, 6, I have found, especially when a spring pressed plunger is utilized to deliver the grease, that a substantially uniform pressure of the plunger is desired. By employing a coil spring 28 of sufficient length it is possible to secure a uniform downward motion of the plunger 19 at all times as the long spring is of such a nature as to move the plunger evenly throughout its travel.

In the stem 20 I provide transversely extending apertures 29 and 30. For coöperating with these apertures pins 31 are used for holding the piston upwardly. When the pin 31 is inserted in the aperture 30 the plunger 19 will be substantially even with the upper portion of the opening 17, thus permitting ease of filling. Sometimes when the bearing generates a great amount of heat due to friction or other causes the heat causes the grease to flow too rapidly if a positively moved plunger is employed, so that when this condition arises the feed of the grease is accelerated by the action thereon of the plunger. To adapt a grease cup of this sort to such usage, after filling it with grease and moving the cover 24 so as to close the opening 17, I lower the plunger 19 so as to be positioned at or near the lower edge of the aperture 17 and insert in the opening 29 in the stem 20 the pin 31 which will then hold the plunger 19 from further downward reciprocation through the action of the spring; while the plunger will also serve as a cover to the interior of the grease cup below the level of the opening 17. In this manner the grease cup may be adapted for use as an inert grease cup reservoir wherein the part to be lubricated draws the lubricant by virtue of the heating thereof.

Figure 2:
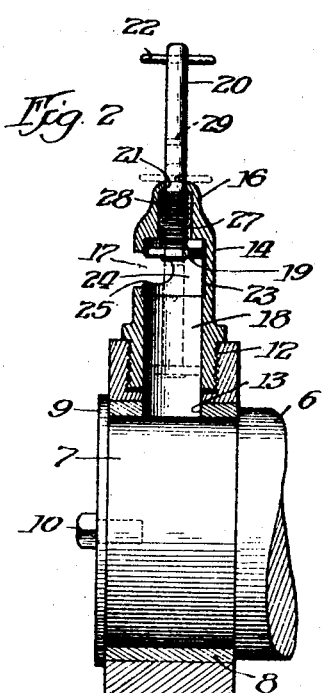
Fig. 2 is a vertical section on line 2—2 of Fig. 1.
Figure 3:
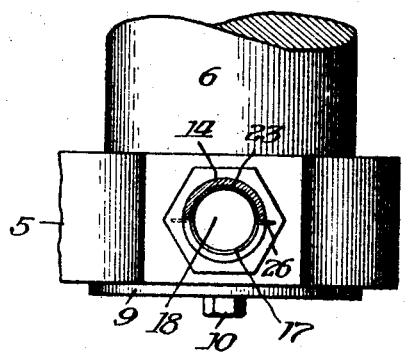
Fig. 3 is a horizontal section on line 3—3 of Fig. 1.

When the cup is arranged to operate under the movement of the spring pressing against the plunger, after filling the interior of the cup through the opening 17, the cover band, which is in the open position shown in Fig. 3, is thus rotated by grasping the handle 26 and moving it until it occupies the position shown by the dotted line in Fig. 3, thus closing the opening 17; the novel arrangement and positioning of the circular band 24 making reciprocation of the plunger 19 possible. When the grease cup is empty the plunger may be moved to its upward position as shown in Fig. 2 by pulling on stem 20 and maintaining the plunger in raised position through the insertion of a pin 31 in the lower aperture in stem 20, then opening the cup or casing by bringing the apertures in cover 24 and in the casing into register through movement of handle 26 into the position shown in Figs. 1 and 3.

It will be apparent from the above description that I have provided a grease cup which is self contained; wherein the cover for the side opening is contained within the casing so as not to be subject to wear or displacement, through reciprocation of the plunger; while at the same time so constructed and positioned as not to interfere with the proper reciprocation of the plunger; all of the parts being so correlated and assembled that displacement of any of the parts is prevented.

I claim:

1. A device of the class described, comprising a single piece casing open at one end and provided with a side opening of substantial size intermediate of its ends, the interior of the casing coincident with said side opening being enlarged or recessed, a cylindrical cover member rotatably mounted in said enlarged portion or recess, with the inner surface of the cover member arranged flush with the inner surface of the casing, said cover member being provided with an opening adapted to register with the side opening in the casing, a spring pressed plunger reciprocatingly mounted within said casing, and means whereby said plunger may be held against reciprocal movement.

2. A grease cup, comprising a casing having a side opening and one open end, the opposite end of the casing being extended to form a chamber, with the end wall thereof apertured substantially at the longitudinal axis of the casing, the casing interior at a point coincident with said side opening being provided with an annular recess, a cover band mounted in said recess so as to be flush with the inner wall of the casing, the cover band being rotatable in the recess and provided with means disposed to the casing interior whereby said cover band may be moved into covering or uncovering positions, a piston reciprocatingly mounted in the casing and adapted to move past said side opening and through said cover band, the piston being provided with a stem disposed through the apertured end wall of the casing, and a spring disposed about said stem and within said chamber and arranged to force the piston toward the open end of the casing.

3. A grease cup, comprising a single piece casing having an open end adapted to be secured to the part to be lubricated, the opposite end being reduced and apertured at the longitudinal axis thereof, the casing having a side opening, slightly removed from said reduced end, for filling purposes, a cover for said opening rotatably mounted within said casing so as to lie flush with the inner walls of the casing and operable from the casing exterior, a plunger reciprocable within the casing and capable of placement intermediate of the side opening and said reduced end, and a spring seated in said reduced end and operable on said plunger for yieldingly forcing the latter toward the open end of the casing.

Signed at Chicago, State of Illinois, this 5th day of June, 1917.

GEORGE H. SARGENT.